(No Model.) 3 Sheets—Sheet 3.
A. DUBOCE.
ADVERTISING OPTICAL APPARATUS.
No. 347,926. Patented Aug. 24, 1886.
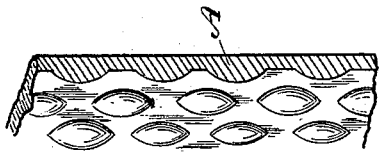
Fig. 7.
Fig. 6.
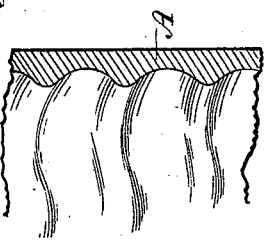
Fig. 5.
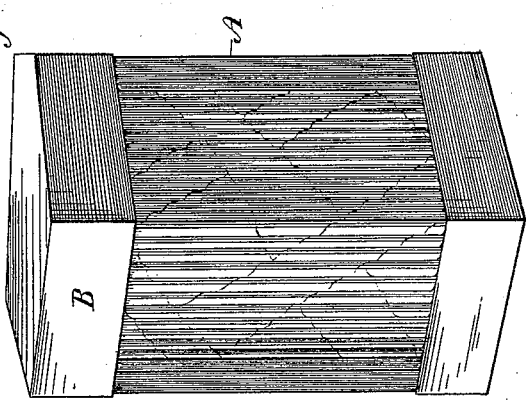
Witnesses,
Geo. H. Strong.
J. H. Nourse.
Inventor,
A. Duboce.
Dewey & Co.
Attorneys

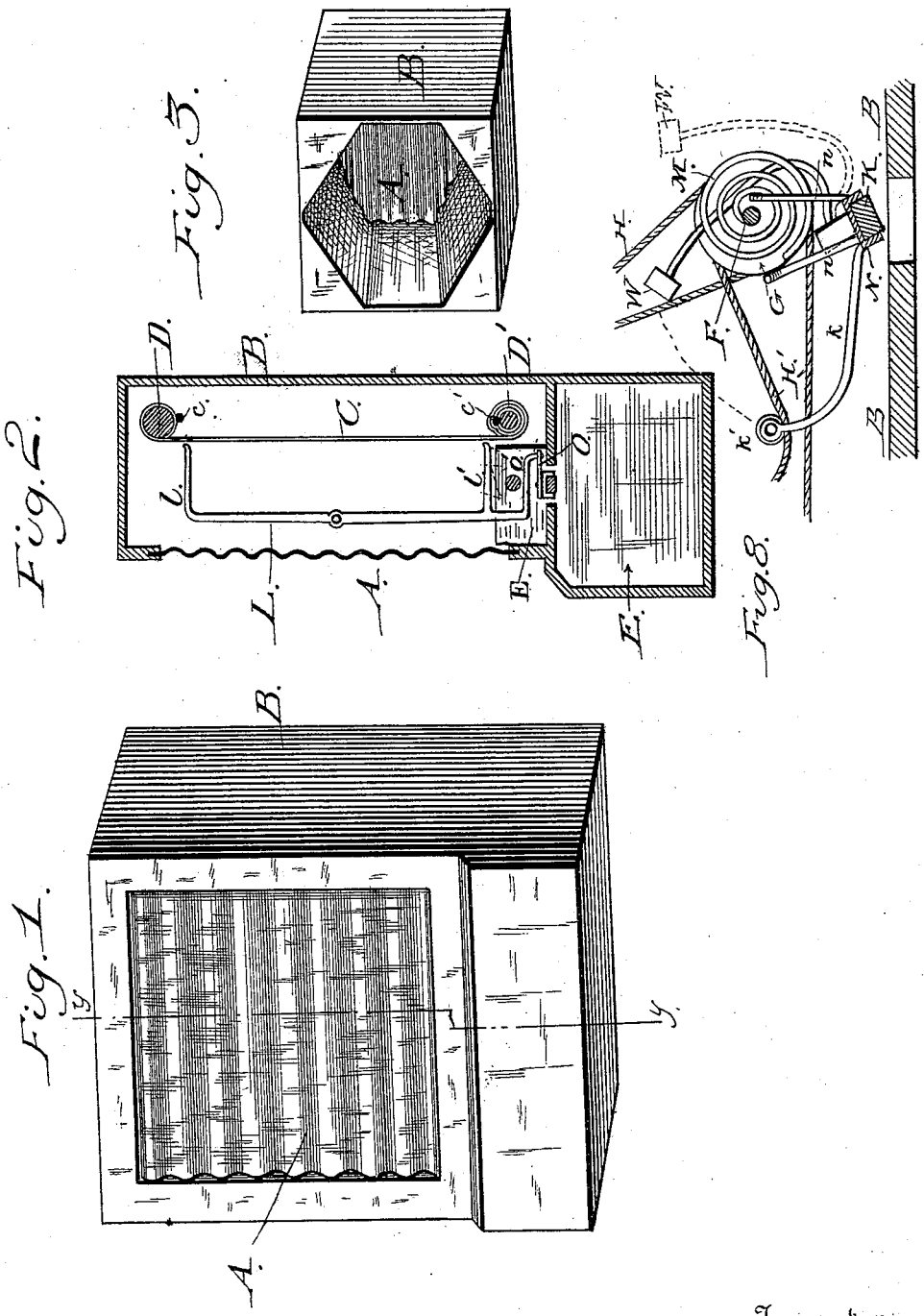

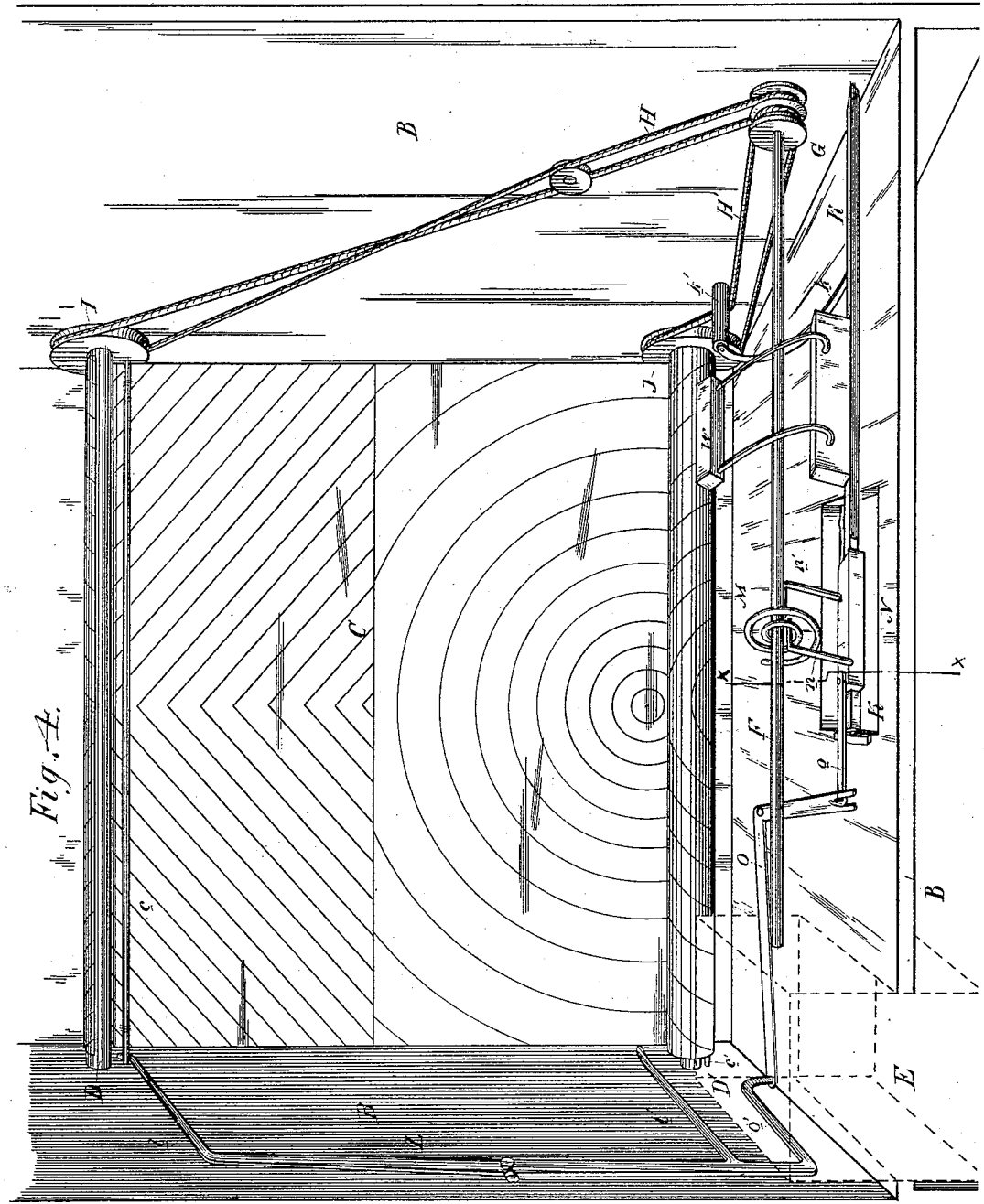

UNITED STATES PATENT OFFICE.

AUGUSTIN DUBOCE, OF SAN FRANCISCO, CALIFORNIA.

ADVERTISING OPTICAL APPARATUS.

SPECIFICATION forming part of Letters Patent No. 347,926, dated August 24, 1886.

Application filed January 24, 1885. Serial No. 153,935. (No model.)

*To all whom it may concern:*

Be it known that I, AUGUSTIN DUBOCE, of the city and county of San Francisco and State of California, have invented an Improvement in Advertising Optical Apparatus, which I term an "Ondulescope;" and I hereby declare the following to be a full, clear, and exact description thereof.

My invention relates to a new and useful optical device or instrument, in the nature of a toy, for amusement alone, or for more practical purposes—such as advertising.

To my invention I have given the name or title of "Ondulescope," this being the French form of the word, derived from the Latin "Undula," a little wave, and the Greek "Σκοπεω," I see. This title is applicable because of the effect produced by the device when in operation, there appearing a succession of waves or undulations, sometimes parallel, sometimes radial and divergent, and sometimes converging to a center or central line, giving an effect at once fascinating and indescribable and resembling the softly-undulating surface of a gently-agitated lake.

My invention consists in one or more plates or sheets of some transparent or semi-transparent material—such as glass, mica, &c.—arranged in a plane surface, a circular or polygonal one, said plate or plates having a corrugated surface, and in a strip or endless band of material moving behind the plates, said material being either semi-transparent or opaque, and having imprinted or otherwise formed thereon a suitable design or combination of designs in lines irregular, angular, or parallel, figures, diametrical or otherwise, diagrams, advertising-mottoes, &c., in colors or plain, so as to present a constantly-moving surface, seen through the plates by means of natural or artificial light placed in proper position, all of which I shall hereinafter fully describe.

The object of my invention is to provide an attractive toy which may be used for amusement alone, or for advertising, or exhibitions of any proper character.

Referring to the accompanying drawings, Figure 1 is a perspective view of my ondulescope seen from in front. Fig. 2 is a vertical sectional view on the line $y\,y$ of Fig. 1. Fig. 3 is a perspective view showing the reflector which may be used. Fig. 4 is a rear view of my ondulescope. Fig. 5 is a perspective showing the corrugations in the plate running lengthwise the frame. Fig. 6 is a detail showing a section of the corrugated plate. Fig. 7 is a detail representing an uneven surface formed by dots or elevations. Fig. 8 is a detail sectional view on the line $x\,x$ of Fig. 4.

For the purposes of the present application I have herein illustrated, and will describe, one form of my device, in which the main principle—namely, the corrugated transparent plate and the moving design—is shown, together with the mechanical means for operating the design, though I do not wish to confine myself to these means, nor to the general surroundings, as these may be varied in many ways.

A is a plate or sheet, which may consist of glass, mica, varnish, or any other suitable transparent or semi-transparent material. This plate has a corrugated surface, as shown, which may be made in the material itself, or by the use of some additional material—such as layers or streaks of varnish—or in any other suitable manner. The corrugations are here shown as parallel transverse ones, though they may be otherwise in direction, as shown in Figs. 5 and 6, or may even be made up of a number of independent dots or elevations and depressions, forming a broken or irregular surface, as shown in Fig. 7. I prefer, however, the parallel transverse corrugations, as being the best to produce the natural undulatory appearance of an agitated body of water. The plate A is set in a box-frame, B.

C is a band or strip of material, upon which are imprinted or otherwise formed a succession of designs in lines, figures, letters, &c.

In the top of the frame is mounted a drum, D, to which the upper end of the strip C is secured, and in the lower part is a drum, D', to which the lower end of said strip is secured. By winding upon one drum and paying out from the other the design-strip is made to travel up or down behind the plate A.

The strip C may be made of any semi-transparent material, to enable light to pass through from behind, or when used in the day-time it may be made of any opaque substance, the light striking it from the front. A number of pieces of variously-printed calico, sewed together, will be found to answer very well.

Upon the strip advertising mottoes, figures, pictures, &c., may be pasted or secured at proper intervals.

The following is a description of a mechanism by which the drums are rotated, and their direction of revolution altered to rewind the strip C. E is a casing, which contains any suitable arrangement of clock-work, unnecessary herein to show. F is a horizontal shaft driven by the clock-work. Upon one end of this shaft is a double-faced sheave, G, from one face of which an endless crossed band, H, extends to a sheave, I, on the end of the upper drum. From its other face an endless band, H', extends to a sheave, J, on the lower drum. Mounted in the base of the frame is a rock-shaft, K, having a balance-weight, W, and an arm, k, which carries a tightener-pulley, k', adapted to be thrown upon the bands H H' alternately, whereby each is tightened sufficiently to transmit movement, while the other remains loose enough to slip. In this way when the tightener-pulley k' is thrown down upon the band H' the motion is transmitted to the lower drum to wind up the strip C thereon, which travels down, while the band H is loose enough to slip. When thrown up against the band H, a reverse movement takes place and the strip C travels up.

The oscillation of the tightener pulley is effected by the following means: Pivoted centrally to one end of the frame B is a lever, L, from the top of which extends an arm, l, and a similar arm, l', extends from near its bottom. Upon the strip C, near its upper end, is secured transversely a rod, c, which, when unwound from the drum, bears down upon the end of arm l, thus throwing the upper end of the lever L forward. Upon the strip C, near its lower end, is a rod, c', which is adapted when freed from the drum to bear up under the arm l', thus throwing the lower end of lever L forward. Upon the shaft F, about its middle, is secured a snail, M. Upon the rock-shaft K is a sleeve, N, sliding upon the shaft K, and within an opening in the bottom or floor of the box-frame, which sleeve carries an angled stud, n, to the left of the snail, and a similar stud, n', to the right, each of which is adapted to engage the coils of the snail alternately, according to the movement of the sleeve to the right or to the left. Pivoted at its angle is a horizontal elbow-lever, O, one end of which is connected with the sliding sleeve by a rod, o, and the other end is connected with the lower end of lever L by a rod, o'. Now, suppose the strip C to be traveling down, winding upon the lower drum and unwinding from the upper one. When its top is sufficiently unwound to free the rod c, it presses down on arm l, thus moving the top of lever L forward and the bottom back. This movement of the bottom swings the elbow-lever O in such a manner that the sleeve N moves to the right, thus moving the sleeve N and its stud n' longitudinally away from the snail and causing its stud n to engage therewith. The revolution of the snail then forces said stud back, which, through its sleeve, rocks the shaft K back, thus throwing the weight W backward and throwing its tightener-pulley k' back against the endless band H, which now being taut transmits motion to the upper drum and relieves the lower one, whereupon the strip C travels up, being wound upon the upper drum and unwound from the lower one. When the strip C at length is unwound enough to free its lower rod, c', it bears up under the arm l', thus throwing the lower end of lever L forward. This movement, through the elbow-lever O, draws the sleeve N to the left, moving stud n away and inserting stud n' into the snail, which rocks the shaft K forward and throws the weight W forward and the tightener-pulley k' down on endless band H', relieving band H. By these means motion is transmitted to the lower drum and the strip C travels down again.

At the stage of operation reached by the parts in the position shown in Figs. 4 and 8 the sleeve N has just been shifted to the right, carrying stud n' away from the snail M and stud n into engagement with the snail. The stud n is about to be pushed over by the rotating snail M to rock the shaft K and transfer the tightener k' from belt H to belt H', to reverse the movement of the strip.

As I have hereinbefore stated, the main feature of my invention lies in the broken, uneven, or corrugated transparent plate, and in the design-strip moving behind it. It is therefore obvious that I may vary the construction and relative positions of many of the parts I have described without materially altering my invention.

Instead of having a plain front to the device, I may have a polygonal conical system of reflectors—such as is shown in Fig. 3—to go in front of the plate A, whereby the designs are reflected in an endless number and variety of images.

The effect produced by the corrugated glass and the moving design is difficult to describe. It approaches nearer to the undulations or waves of a gently-agitated body of water than to any other appearance, and is on the whole an interesting sight, which may be made to serve the purposes of amusement or business.

Having thus described my invention, what I claim as new, and desire to secure by Letters Patent, is—

1. In an optical device, one or more plates or sheets of transparent or semi-transparent material having a corrugated surface, in combination with a moving design or series of designs behind the plates or sheets, substantially as herein described.

2. In an optical device, one or more plates or sheets of transparent or semi-transparent material having a surface corrugated in parallel lines, in combination with a moving design or series of designs behind the plates or sheets, substantially as herein described.

3. In an optical device, one or more plates or sheets of transparent or semi-transparent material having a surface corrugated in parallel lines, in combination with a design or series of designs behind the plates or sheets, and moving at right angles with the parallel corrugations, substantially as herein described.

4. In an optical device, the frame B, and the transparent plate A in its front, having a corrugated surface, in combination with the traveling design-strip C, moving behind the plate A, substantially as herein described.

5. In an optical device, the frame B, and the transparent plate A in its front, having a corrugated surface, in combination with the traveling strip C, having designs of suitable nature upon it, and the drums D D', upon and from which the strip is wound and unwound, whereby it is caused to move behind plate A, substantially as herein described.

6. In an optical device, the frame B, and the transparent plate A in its front, having a corrugated, broken, or uneven surface, in combination with the traveling design-strip C, behind the plate, the drums D D', upon which the strip is wound and unwound, the driving-shaft F, and sheaves G I J, and bands H H', by which the drums are operated, substantially as herein described.

7. In an optical device, the frame B, and the transparent plate A in its front, having a corrugated, broken, or uneven surface, in combination with the traveling design-strip C, behind the plate, the drums D D', upon which the strip is wound and unwound, the driving-shaft F, the sheaves G I J, and endless bands H H', and the mechanism by which the direction of travel of the strip is changed, consisting of the oscillating tightener-pulley k', operated, through suitable intermediate devices, by the traveling strip, substantially as herein described.

8. In an optical device, the frame B, and the transparent plate A in its front, having a corrugated, broken, or uneven surface, in combination with the traveling design-strip C, behind the plate, the drums D D', upon which the strip is wound and unwound, the driving-shaft F, the sheaves G I J, and endless bands H H', and the mechanism by which the direction of travel of the strip is changed, consisting of the rock-shaft K, having tightener-pulley k', the sliding sleeve N on the rock-shaft, having studs n n', the snail M on the shaft F, with which the studs engage, and a means operated by the traveling strip C for moving the sliding sleeve N, substantially as herein described.

9. In an optical device, the frame B, and the transparent plate A in its front, having a corrugated, broken, or uneven surface, in combination with the traveling design-strip C, behind the plate, the drums D D', upon which the strip is wound and unwound, the driving-shaft F, the sheaves G I J, and endless bands H H', and the mechanism by which the direction of travel of the strip is changed, consisting of the rock-shaft K, having tightener-pulley k', the sliding sleeve N on the rock-shaft, having studs n n', the snail M on the shaft F, the pivoted lever L, having arms l l', the rods c c' on the strip C engaging the arms, and the pivoted elbow-lever O, connected with lever L and sleeve N, all arranged and adapted to operate substantially as herein described.

In witness whereof I have hereunto set my hand.

AUGUSTIN DUBOCE.

Witnesses:
 C. D. COLE,
 J. H. BLOOD.